Figure 1:
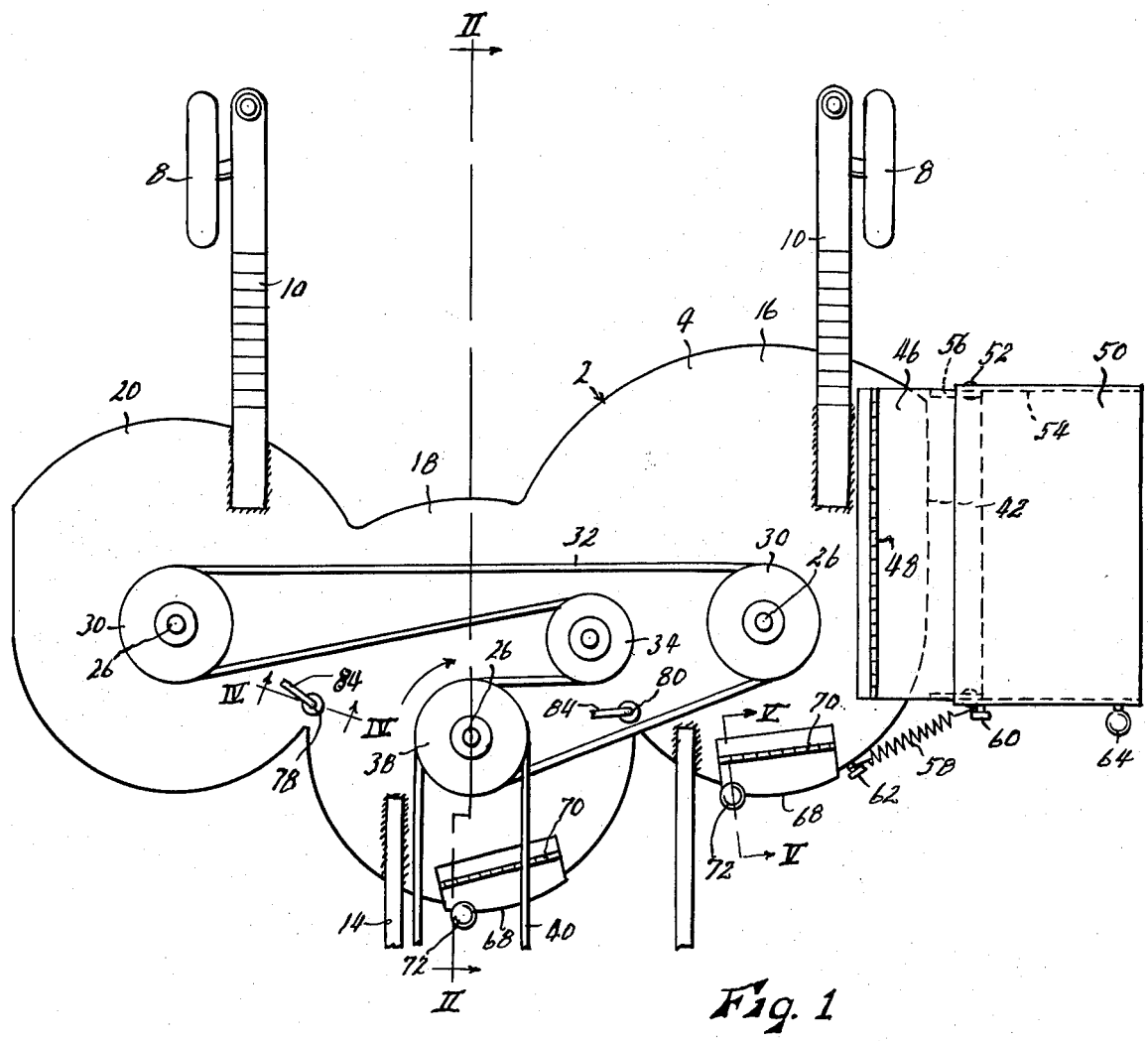

United States Patent [19]

Mullet et al.

[11] 4,226,074

[45] Oct. 7, 1980

[54] LAWNMOWER DECK

[75] Inventors: David L. Mullet, Hesston; Raymond J. Rilling, Moundridge; Elmer D. Voth, Newton, all of Kans.

[73] Assignee: Excel Industries, Inc., Hesston, Kans.

[21] Appl. No.: 1,532

[22] Filed: Jan. 8, 1979

[51] Int. Cl.³ .......................................... A01D 67/00
[52] U.S. Cl. ..................................... 56/320.2; 56/6; 56/13.6
[58] Field of Search ................. 56/320.2, 202, 6, 13.6

[56] References Cited

U.S. PATENT DOCUMENTS

| | | | |
|---|---|---|---|
| 2,578,880 | 12/1951 | Doyle | 56/320.2 |
| 2,815,634 | 12/1957 | Bush | 56/13.6 |
| 2,816,410 | 12/1957 | Nobles | 56/13.6 |
| 2,857,727 | 10/1958 | Cole | 56/320.2 |
| 3,157,014 | 11/1964 | Bottenberg | 56/320.2 |
| 3,234,719 | 2/1966 | Rank | 56/320.2 |
| 3,404,519 | 10/1968 | Demers | 56/320.2 |
| 3,696,595 | 10/1972 | Dahl | 56/320.2 |
| 3,916,606 | 11/1975 | Brudnak, Jr. | 56/320.2 |
| 3,925,972 | 12/1975 | Andersson | 56/320.2 |
| 4,114,353 | 9/1978 | Ansbaugh et al. | 56/202 |

FOREIGN PATENT DOCUMENTS 563654  9/1958  Canada ..................... 56/320.2

Primary Examiner—Paul J. Hirsch
Attorney, Agent, or Firm—John A. Hamilton

[57] ABSTRACT

A lawnmower deck of inverted dish shape having three generally circular, laterally spaced but interconnected open-bottomed compartments in each of which is mounted a horizontally extending blade rotatable on a vertical axis and operable to impel cuttings from one compartment to the next toward one side of the deck, the deck having an outlet opening at that side and at the rearward portion of at least certain of the compartments, there being controllable gates at each of the outlet openings and between each successive pair of compartments, to the end that by opening or closing the gates in the proper combinations, the cuttings may be selectively discharged to the side or to a grass collector, or discharged to the rear, or finely mulched for rapid decomposition to enrich the soil.

3 Claims, 7 Drawing Figures

LAWNMOWER DECK

This invention relates to new and useful improvements in lawnmower decks, and has particular reference to characteristics of the deck which determine the disposition of the grass cuttings severed from the lawn by the mower blades.

Perhaps most commonly, it is desired that the cuttings be discharged laterally to one side of the path of travel of the mower, either to be distributed evenly over the lawn surface, or to be caught and retained for later disposal by a collector attachment mounted on the mower. In other cases, as when side discharge would spread the cuttings objectionably over paved or other surfaces adjacent the lawn, it may be desired to discharge the cuttings to the rear, over the lawn surface just cut by the mower. In still other circumstances, it may be desired to further cut up the longer grass cuttings very finely to form a mulch before depositing it on the lawn surface. The finely divided condition of the mulch causes it to decompose rapidly to enrich the soil.

The primary object of the present invention is the provision of a lawnmower deck which is readily adjustable to provide any of these three types of discharge, that is, side discharge, rear discharge, or mulching.

Generally, this object is accomplished by the provision of a deck of inverted dish shape, with a depending skirt around its edge, and having a horizontal blade rotatable on a vertical axis mounted within said deck above the lower edge of the skirt. The skirt has a side opening, at the side of the deck toward which the forward portion of the blade orbit moves, and a rear opening, and each of said openings has a gate which may be selectively opened or closed. The cuttings initially tend to remain above the plane of the blade and be moved horizontally in the direction of blade rotation, by the air currents created by motion of the blade, until they reach whichever gate may be open. If both gates are closed, the cuttings tend to be trapped and retained in the deck, being more and more finely chopped by the blades to a mulch before finally falling to the ground beneath the blade.

Another object is the provision of a lawnmower deck of the character described including a series of blades spaced apart laterally of the deck, and disposed in separate but interconnected compartments of said deck. Each compartment may have a gated rear opening in its skirt, but only the compartment at the side of the deck toward which the forward portions of the blade orbits move has a gated side opening in its skirt. This form of the invention additionally requires a gate which may be selectively opened or closed between each successive pair of deck compartments, and capable of obstructing the horizontal flow of cuttings from compartment to compartment in the deck interior above the horizontal plane of the blades.

A further object is the provision of a lawnmower deck of the character described wherein the gate of the side deck opening is of a novel construction whereby it may selectively close said side opening when side discharge is not desired, or form a laterally extending chute for the cuttings when side discharge is desired. The extending chute is generally required for purposes of safety, both to prevent the operator from extending his foot through the side opening into the path of the blades, and to protect nearby persons against injury by stones or other small objects which may be thrown through the side opening by the blades.

Other objects are simplicity and economy of construction, ease and convenience of use, and efficiency and dependability of operation.

Figure 2:
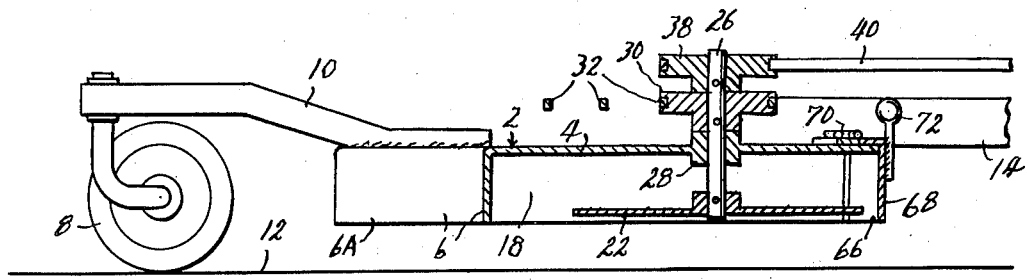
Figure 3:
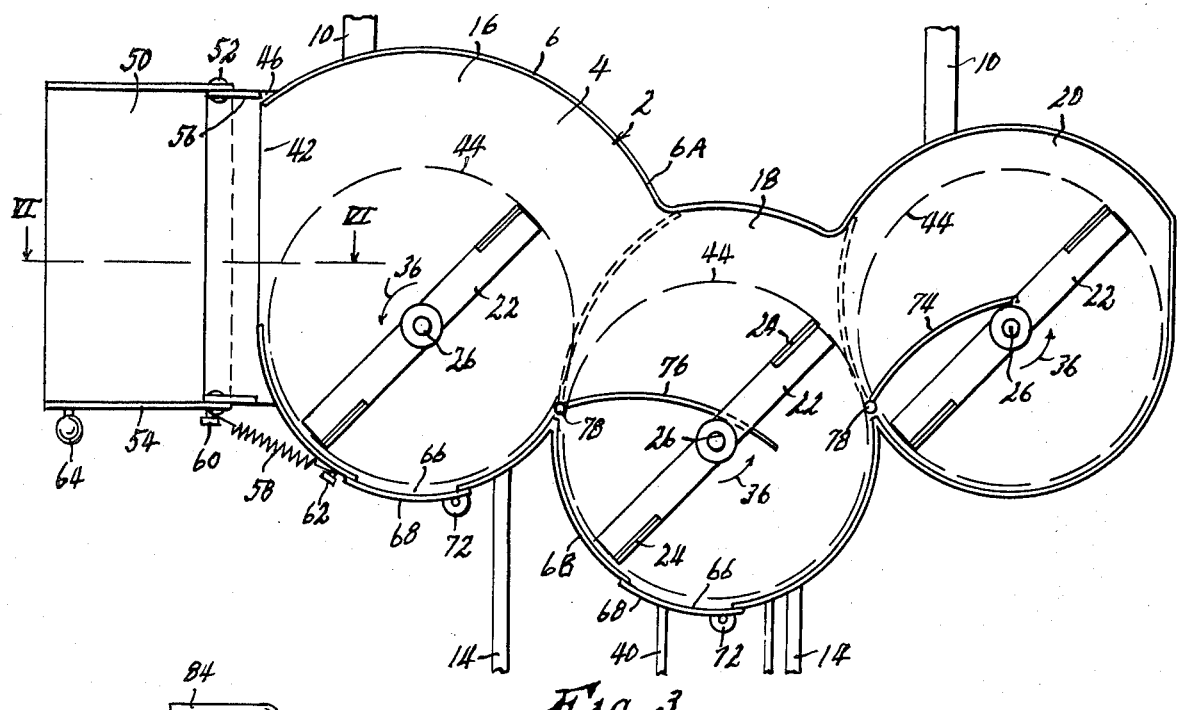
Figure 4:
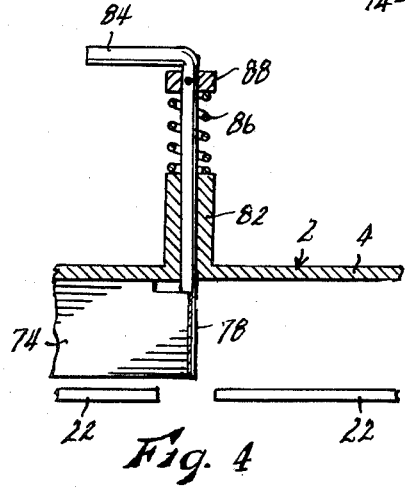
Figure 5:
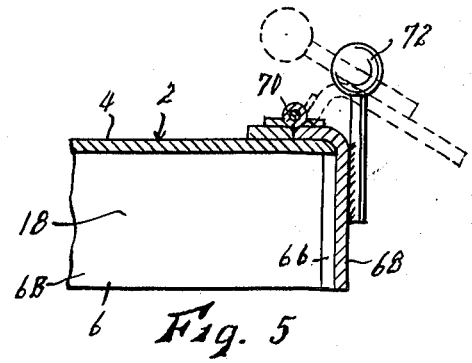
Figure 6:
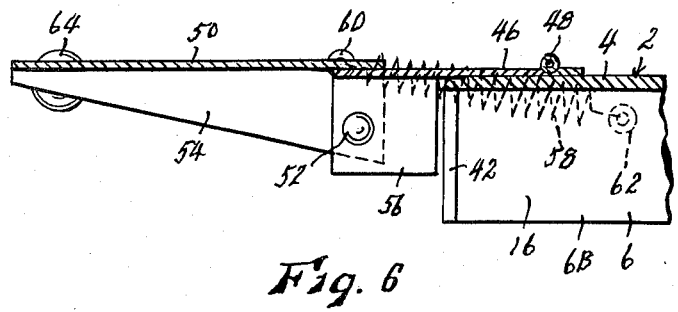
Figure 7:
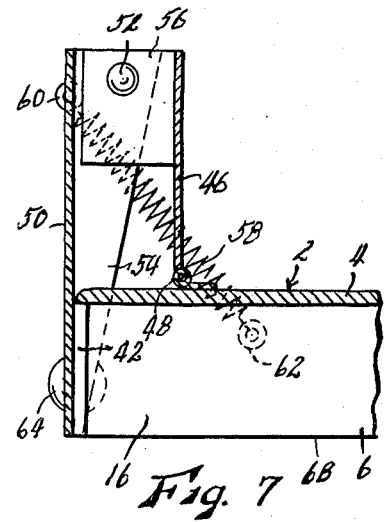

With these objects in view, as well as other objects which will appear in the course of the specification, reference will be had to the accompanying drawing, wherein:

FIG. 1 is a fragmentary top plan view of a lawnmower deck embodying the present invention, set to provide side discharge of cuttings, FIG. 2 is a sectional view taken on line II—II of FIG. 1, FIG. 3 is an inverted plan view of the deck as shown in FIG. 1, FIG. 4 is an enlarged, fragmentary sectional view taken on line IV—IV of FIG. 1, FIG. 5 is an enlarged, fragmentary sectional view taken on line V—V of FIG. 1, showing one of the rear gates closed in solid lines and open in dotted lines, FIG. 6 is an enlarged, fragmentary sectional view taken on line VI—VI of FIG. 2, showing the side gate open to form a laterally extending discharge chute, and FIG. 7 is a view similar to FIG. 6, but showing the side gate closed.

Like reference numerals apply to similar parts throughout the several views, and the numeral 2 applies generally to the deck body, consisting of a planar plate 4 having a depending integral vertical skirt 6 around its entire periphery except for certain interruptions therein to form outlet openings for grass cuttings, as will be described. Said deck body is supported at its forward side by a pair of castered front wheels 8 carried at the forward ends of arms 10 welded or otherwise rigidly affixed at their rearward ends to deck plate 4, with the lower edge of skirt 6 spaced above ground level 12, as shown in FIG. 2. The particular form of deck selected for illustration has a pair of rearwardly extending draft bars 14 affixed to the rearward portion thereof as by welding, and pivoted at their rearward ends to a small tractor or the like, not shown, for movement on a horizontal transverse axis, so that wheels 8 rest on the ground to support the deck. Usually, provisions are made to adjust the height of the deck above ground level, whereby to adjust the height to which the grass is cut, but this is not pertinent to the present invention.

Horizontally, deck 2 has the form of three generally circular compartments 16, 18, 20, spaced laterally of the deck but intersecting each other so as to be interconnected, with front portion 6A of the skirt forming the front wall of all of the compartments, and rear portion 6B of the skirt forming the rear wall of all of the compartments, as best shown in FIG. 3. In each compartment, a horizontal blade 22 having a longitudinal cutting edge 24 at each end thereof is fixed at its midpoint to the lower end of a vertical shaft 26. The horizontal plane of each blade is disposed slightly above the lower edge of skirt 6. Said shaft extends upwardly and rotatably through a bearing 28 provided in deck plate 4, and has a pulley 30 fixed thereto above the deck plate. All of pulleys 30 are operably interconnected by a belt 32, which also passes around an idler pulley 34 carried by the deck plate to insure full engagement of the belt with the central pulley 30, so that all of the blades turn at the same speed in the same direction, as indicated by arrows 36 in FIG. 3. A second pulley 38 fixed on the shaft 26 of the central blade is operably connected by a belt 40 to a suitable power drive, not shown but carried by the tractor to which the deck is connected by draft bars 14, whereby blades 22 are driven.

Deck skirt 6 is interrupted at the right side, as viewed from above, or at the left as viewed in FIG. 3, to form a laterally directed discharge opening 42. It will be seen in FIG. 3 that as the deck is moved forwardly with blades 22 turning as shown, the cutting edges 24 of said blades cut the grass mainly in the forward portions of their orbits. Thus in side discharge operation the cuttings are impelled to the left, as viewed in FIG. 3, both by the momentum imparted thereto by the blades, and by air currents generated by the motion of the blades. Thus the travel of the cuttings, principally above the plane of the blades and across the front portion of the deck, is from compartment 20 to compartment 18 to compartment 16, and outwardly through discharge opening 42. Rear skirt portion 6B includes arcuate segments each concentric with a blade and closely spaced just outside the orbit of the tips of the blade, the blade tip orbits being indicated by dashed circles 44 in FIG. 3. Front skirt section 6A also includes arcuate segments each concentric with one of the blades, but these segments, as related to compartments 20, 18 and 16 in that order, are spaced progressively farther away from the blade orbits, as shown. This is done to accomodate the growing volume of cuttings toward the left side of the deck. It will be seen that shaft 26 of the central blade is disposed rearwardly of those of the side blades, and that the spacing between adjacent shafts is slightly greater than the diameter of the orbit of a blade, so that adjacent blades cannot interfere with each other, but that the spacing between successive shafts 26, laterally of the deck itself, is slightly less than the diameter of the orbit of a blade, so that the blade orbits overlap each other laterally of the deck. Thus there can be no uncut strips of grass left between successive blades as the mower moves over the ground.

In side discharge operation, side opening 42 must of course be open, but for safety reasons should have a laterally extending discharge chute extending outwardly therefrom to prevent the possibility that an operator might insert his foot through opening 42 into the path of a blade 22, and to protect nearby persons from being injured by small rocks or other small objects thrown by the blades. This chute is shown in FIGS. 1, 3, 6 and 7. It includes a rectangular plate 46 pivoted at one edge to the top surface of deck plate 4 by hinge 48, said hinge extending forwardly and rearwardly in inwardly spaced relation from the right edge of the deck. Plate 46 is adapted to lie flat against the top of the deck plate, as in FIG. 6, and extends outwardly past the right edge of the deck. Another plate 50 is pivoted to the outer edge of plate 46, by means of rivets 52 joining depending side walls 54 and 56, respectively of plates 50 and 46. Said rivets are disposed beneath said plates, are coaxial, and are parallel to hinge 48. Plate 50 overlaps the top of plate 46 to limit its upward pivotal movement. A tension spring 58 is connected at one end to plate 50, as at 60, and at its opposite end to deck skirt 6, as at 62. When the chute is extended for use, as in FIG. 6, it will be seen that in a plane normal to hinge 48, the axis of spring 58 passes below the axis of hinge 48, whereby plate 46 is held down firmly against the deck plate, but above the axis of rivets 52, whereby plate 50 is held firmly in its horizontally extended position.

As will appear, in the rear discharge or mulching operations, side outlet 42 of the deck must be closed. For this purpose, plate 50 is provided with a handle 64 which may be grasped manually to move plates 46 and 50 to the positions shown in FIG. 7, wherein they are disposed in parallel vertical planes with plate 50 covering side opening 42 to prevent the discharge of cuttings therethrough. The axis of spring 58 then passes above the axis of hinge 48, whereby plate 46 is held in an upright position, and below the axis of rivets 52, whereby plate 50 is held firmly against the side of the deck. Thus plate 50 serves both as a side discharge chute when extended as in FIG. 6, and as a gate for closing side opening 42 of the deck when retracted as in FIG. 7.

For further use in the rear discharge and mulching operations, a rear opening 66 is provided in rear section 6B of the skirt at the rear of each of compartments 16 and 18. Each of said rear openings is controlled by a gate 68, whereby said opening may be selectively opened or closed. As best shown in FIGS. 3 and 5, each of said gates, when closed, overlies its associated opening 66, is pivoted to the top surface of deck plate 4 by a hinge 70, and is provided with a handle 72 by means of which it may be moved from a closed position as shown in solid lines in FIG. 5, to an open position as shown in dotted lines. Hinge 70 is of a friction type whereby said gate will remain in any position to which it is manually moved. Also, there are provided two gates 74 and 76 internally of the deck. Gate 74 is fixed at one end to a vertical shaft 78 disposed closely adjacent rear skirt 6B intermediate deck compartments 18 and 20, and extends horizontally therefrom in the form of an arcuate leaf having parallel upper and lower edges, its upper edge bearing frictionally against the lower surface of deck plate 4, and its lower edge being disposed slightly above the blade plane, so as not to interfere with the rotation of the blades. It is of sufficient radial length that when turned by rotation of its shaft 78 to the position shown in dotted lines in FIGS. 3, it engages front skirt 6A substantially at the juncture of compartments 18 and 20, thereby forming a gate dividing compartment 18 from compartment 20, in the depth of the deck between deck plate 4 and blades 22. This is its closed position. In its open position, the free end portion thereof lies closely adjacent the blade shaft 26 within compartment 20, as shown in solid lines. Similarly, gate 76 is fixed to a vertical shaft 80 disposed adjacent rear skirt 6B at the juncture of deck compartments 16 and 18, and has a closed position in which its free end contacts front skirt 6A at the juncture of compartments 16 and 18, and an open position, shown in solid lines, wherein its free end lies closely adjacent the blade shaft 26 of compartment 18. Each of shafts 78 and 80 extends upwardly and rotatably through a bearing sleeve 82 provided on deck plate 4 (see FIG. 4), and is bent over in spaced relation above said sleeve to form a handle 84 by means of which the shaft may be turned. A compression spring 86 on the shaft is compressed between the upper end of sleeve 82 and a collar 88 fixed on the shaft, and serves to urge said shaft slidably upwardly through the sleeve to maintain the associated gate 74 or 76 in frictional engagement with deck plate 4, so that said gate will remain in whatever angular position to which they are turned by manipulation of handles 84.

In side discharge operation, chute-gate plate 50 is extended to its FIG. 6 position whereby to open side outlet 42, internal gates 74 and 76 are moved to their open positions, and rear gates 68 are closed, all as shown in FIG. 3. Then, as the deck is moved forwardly, cuttings from the blade in compartment 20, which are cut principally in the forward portion of its orbit, tend to be impelled or blown horizontally to the right (left in FIG. 3) into the forward portion of compartment 18, where they mingle with the cuttings of the blade in that compartment and are impelled into the forward portion of compartment 16, where they mingle with the cuttings of the blade in that compartment, and finally are impelled outwardly through chute 46-50 to be distributed evenly over the ground surface transversely spaced from the line of travel of the mower. The open gates 74 and 76 tend to assist the described flow of the cuttings from compartment to compartment. These gates are above the blades, but the cuttings also tend to remain above the blades, and to travel horizontally, so long as their path of travel is not obstructed. Therefore, the cuttings are not appreciably comminuted or mulched in this type of operation.

For rear discharge operation, chute-gate 46-50 is closed as in FIG. 7, gate 74 is opened, gate 76 is closed, and rear gates 68 are opened. The cuttings of compartment 20 thus still pass to compartment 18 to mingle with the cuttings of the latter compartment, but cannot pass to compartment 16 due to the closure of gate 76. Again, most of the cuttings of compartments 20 and 18 are prevented from passing to compartment 16 by the fact that most of said cuttings are initially disposed above the blades. Therefore, the cuttings pass around compartment 18 until they reach and exit through rear outlet opening 66 thereof, whereby to be discharged behind the deck rather than to the side as before. Likewise, the cuttings of compartment 16, since gate 50 is closed, can exit from the deck only through the now open rear exit opening 66 of that compartment. Of course, it would be possible also to provide compartment 20 with a rear outlet opening 66 and gate 68 in the same manner as compartments 16 and 18. In that case, gate 74 would also be closed for rear discharge operation. However, it has been found that rear discharge from compartment 20 is often objectionably interfered with when that side of the mower is used to cut closely around trees and other upstanding obstructions, as it often is when the mower is arranged as shown, so that transfer of the cuttings of that compartment to compartment 18, and their rearward discharge from the latter, is usually preferable.

For mulching operation, all of gates 50, 68, 74 and 76 are closed. Thus there is no horizontal outlet for cuttings from any of the deck compartments above the level of the blades. Thus the cuttings tend to remain in the compartments for a longer period of time, during which they are further cut and chopped by the blades to be comminuted to very small particles and fall through the planes of the blades to the ground directly beneath the blades.

While we have shown and described a specific embodiment of our invention, it will be readily apparent that many minor changes of structure and operation could be made without departing from the spirit of the invention.

What we claim as new and desire to protect by Letters Patent is:

1. A lawnmower deck comprising:
   a. a deck body consisting of a horizontal deck plate having a peripheral depending skirt, whereby to form a plurality of compartments spaced laterally apart beneath said deck plate, said skirt being interrupted to form a laterally opening side outlet for cuttings, relative to the direction of travel of the mower, and a rear outlet for cuttings at the rearward portion of at least certain of said compartments,
   b. means for supporting said deck body for movement over the ground with the lower edge of said skirt spaced above ground level,
   c. a rotatably driven horizontal blade mounted in each of said deck compartments below said deck plate and all turned in the same direction so that in the forward portions of their orbits they move toward the side of said deck having said side outlet opening, said compartments being interconnected in a path across the forward portions of said blades,
   d. a gate movably mounted on said deck body and operable to selectively open or close said side outlet opening,
   e. a gate movably mounted on said deck body in association with each of said rear outlets, each operable to selectively open or close its associated rear outlet, and
   f. a gate disposed interiorly of the deck intermediate each successive pair of compartments, said gate being movable relative to said deck body selectively either to close the interconnection between said successive compartments, or to open said interconnection.

2. A lawnmower deck as recited in claim 1 wherein each of said interior gates is fixed at one end to a vertical shaft pivoted in said deck plate and extending above said plate to form a handle by which said gate may be turned, said shaft being disposed closely adjacent the rear portion of said skirt, and said gate being of sufficient radial extent from said shaft to be capable, at one angular position of said shaft, of engaging the forward portion of said skirt.

3. A lawnmower deck as recited in claim 2 wherein said gate shaft is vertically slidable relative to said deck plate, and with the addition of resilient means biasing said shaft upwardly, whereby the upper edge of said gate is maintained in frictional engagement with the lower surface of said deck plate, and substantial manual force must be applied to said handle to turn said gate.

* * * * *